Sept. 2, 1969 S. TESZNER 3,465,216

BISTABLE SEMICONDUCTOR DEVICE FOR HEAVY CURRENTS

Filed July 19, 1967 4 Sheets-Sheet 1

INVENTOR
Stanislas TESZNER
BY
Raymond A. Robic
ATTORNEY

INVENTOR
Stanislas TESZNER
BY
Raymond A. Robic
ATTORNEY

BISTABLE SEMICONDUCTOR DEVICE FOR HEAVY CURRENTS

Filed July 19, 1967 4 Sheets-Sheet 3

INVENTOR
Stanislas TESZNER
BY
Raymond A. Blair
ATTORNEY

Sept. 2, 1969 S. TESZNER 3,465,216

BISTABLE SEMICONDUCTOR DEVICE FOR HEAVY CURRENTS

Filed July 19, 1967 4 Sheets-Sheet 4

INVENTOR
Stanislas TESZNER
BY
Raymond A. Robic
ATTORNEY

United States Patent Office 3,465,216
Patented Sept. 2, 1969

3,465,216
BISTABLE SEMICONDUCTOR DEVICE FOR HEAVY CURRENTS

Stanislas Teszner, Paris, France, assignor of one-half to Societe de Constructions Electromecaniques Jeumont-Schneider, Paris, France Filed July 19, 1967, Ser. No. 654,435
Claims priority, application France, July 22, 1966, 70,448
Int. Cl. H01l *11/00, 15/00*
U.S. Cl. 317—235 11 Claims

ABSTRACT OF THE DISCLOSURE

A semiconductor switching device having at least four layers of alternate P and N conductivity types with a rectifying P/N grid in one of the intermediate layers, and at least four terminals.

The present invention relates to heavy duty semi-conductor bistable switching devices which are capable of changing from one state to the other, notably from the non-conductive state to the conductive state and vice versa, under the influence of a control pulse.

The construction of the devices according to the invention is derived from the construction of the device known as a "gridistor," and more particularly from the construction of the bipolar power gridistor. These devices will hereinafter be referred to as bistable power gridistors.

Devices called "thyristors" are also known. Thyristors comprise four semiconductor layers of alternate types, having a rectifying junction in the unidirectional version, which is the commoner, and five layers in the bidirectional version. These devices have two stable states, i.e. the conductive state and the non-conductive state, and can change from the non-conductive state to the conductive state under the action of a brief pulse of relatively low power. On the other hand, the inverse change from the conductive state to the non-conductive state presents greater difficulty, because it has hitherto been possible to effect it industrially only for low powers, i.e. at most for currents of the order of several amperes at voltages of the order of about one hundred volts, and this only in the unidirectional version, by means of an appreciable lowering of the characteristics in the conductive state, and finally despite a considerable increase in the length and the power of the control pulse.

When slightly higher currents have to be interrupted, the recoverable voltage falls rapidly, and conversely for higher recovery voltages the current that can be interrupted is very rapidly lowered.

The major reason for this deficiency appears to be the fact that hitherto, for blocking the current, one has merely attempted to stop the carrier emission of the main emitting junction without any attempt to regenerate the spaces which are to withstand the recovery voltage. This results in insufficient stability of this voltage in the device. This supplies a valid explanation of the lowering of performance with an increase of the amplitude and of the speed of recovery of the voltage across the terminals in the non-conductive state.

A second reason arises out of the fact that the construction of thyristors, and more particularly that of their layers which receive the pulse, is insufficiently distributed. Consequently, the transverse resistance of the layer gives rise, at the passage of the pulse current, to a transverse voltage drop, and therefore to an electrical field which tends to oppose the penetration of this current and prevents its uniform distribution. Consequently, the supply to the base electrode is badly distributed and this defect is obviously accentuated with the increase of the transverse dimensions which is necessary when the rated current is increased. This explains the difficulty experienced in interrupting currents by the method under consideration, no matter how small they are.

Now, the bipolar power resistor provides a remarkable solution to this double difficulty, firstly by virtue of its perfectly distributed configuration and secondly by the very mechanism by which the current is blocked, utilising successively the extraction of the minority carriers and the repulsion of the majority carriers by the development of the space charges due to the electrical field effect.

According to the present invention there is provided a heavy duty semiconductor bistable switching device having at least four semiconductor layers of alternate P and N types, a grid embedded in one of the intermediate layers, terminals connected to the end layers and control electrodes connected to the grid and at least one other intermediate layer, whereby said device is rendered conductive by the application of a pulse between the control electrode connected to the intermediate layer and the terminal connected to the outside layer nearest thereto and is rendered non-conductive by the application of a pulse between said intermediate layer and grid.

In one preferred form the deivce has a first semiconductor layer of a first type (either P or N), a second semiconductor layer of opposite type covering this first layer and joined therewith, a semiconductor grid of the first type embedded in the second layer, a third semiconductor layer of the first type covering the second layer and joined therewith, a fourth semiconductor layer of opposite type to the first layer covering the third layer and joined therewith, terminals connected to the first and fourth layers, and control electrodes connected to the grid and second layer, whereby said device is rendered conductive by the application of a pulse between the first and second layers and is rendered non-conductive by the application of a pulse between the second layer and grid.

In another preferred form the device has a first semiconductor layer of a first type (either P or N), a second semiconductive layer of opposite type covering this first layer and poined therewith, a third semiconductive layer of the first type covering the second layer and joined therewith, the junction between the second and third layers being of serrated profile, a fourth semiconductive layer of opposite type to the third layer, said third layer acting as a grid in which the meshes have been closed by the narrow constricted zones formed in the third layer between the second and fourth layers by the serrated profile, terminals connected to the first and fourth layers, and control electrodes connected to the grid constituted within the third layer and to the second layer, whereby said device is rendered conductive by the application of a pulse between the grid and the fourth layer and is rendered non-conductive by the application of a pulse between the second layer and the grid constituted within the third layer.

The invention will now be described in greater detail by way of example with reference to and as illustrated in the accompanying drawings, in which.

Figure 1:
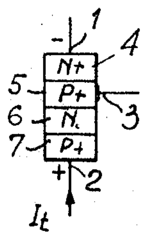
FIGURES 1, 2 and 3 illustrate conventional thyristors for the purpose of analysing their characteristics.
Figure 2:
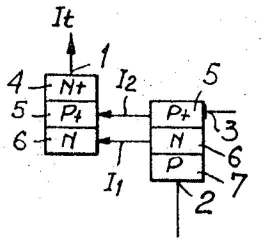

FIGURES 1 and 2 respectively illustrate the basic construction of a unidirectional thyristor and its usual subdivision into two complementary (N-P-N and P-N-P) transistors, which are imbricated and supply one another. The thryristor comprises a cathode 1, an anode 2, a control electrode 3, an emitter layer 4 corresponding to that of the N-P-N transistor, a first base layer 5, corresponding to the base layer of the N-P-N transistor and to the collector layer of the P-N-P transistor, a second base layer 6 corresponding to the collector layer of the N-P-N transistor and to the base layer of the P-N-P transistor, and an anode layer 7, corresponding to the emitter layer of the P-N-P transistor.

The junction 4–5 is biassed in the forward conducting direction, with the polarities of the unidirectional voltage as illustrated in FIGURE 1. There is therefore an emission of charge carriers, which become increasingly appreciable as soon as a certain threshold voltage (of the order of 0.5 v. in the case of silicon) is exceeded. The junction 6–7 is also biassed in the forward conducting direction. Only the junction 5–6 is biassed in the inverse direction, and it is this junction which effects the blocking.

In the non-conducting state, the residual current is substantially inversely proportional to $b=[1-\alpha_1+\alpha_2]$, in which $\alpha_1$ and $\alpha_2$ are respectively the static current gain factors (ratio of the collected current to the omitted current) of the complementary transistors. As is shown, these factors $\alpha_1$ and $\alpha_2$ are a function of the currents $I_1$ and $I_2$ passing through these respective transistors, and of the ratio $L_d/\Delta_W$, in which $L_d$ is the diffusion length of the minority carriers injected into the base layer of the transistor under consideration and $\Delta_W$ is the thickness of this base layer. In conventional constructions, means are provided to ensure that, in the non-conducting state, these factors are sufficiently small for $b$ to be only slightly different from unity. Thus, the total current $I_t$ is of the order of the leakage current of the non-conducting junction 5–6.

In order to bring about the conductive state, the current of majority carriers is injected into the base layer of one of the transistors, in the present instance the N-P-N transistor, or the first base layer 5, through the control electrode 3, the pulse being applied to the negatively and positively biassed cathode 1 and control electrode 3 respectively. It should be noted that this could also be done in the base layer of the P-N-P transistor with an inverse construction. This injected current produces a sudden increase of $\alpha_1$, which results in a considerable increase in the current injected into the base of the P-N-P transistor, which in turn produces the increase of $\alpha_2$. The "triggering" of the thyristor to the conductive state takes place when the sum of the factors $(\alpha_1+\alpha_2)$ reaches 1, even if only on a small portion of the cross-section of the component transistors. The current $I_t$ then shows a sudden increase accompanied by a collapse of the voltage across the terminals of the thyristor. The sum $(\alpha_1+\alpha_2)$ also continues to increase under so-called boost conditions, the current $I_t$ continuing to rise, while the two component transistors operate under mutual boost conditions, with the voltages at the respective terminals in the saturation zone. There is then merely required to render the thyristor conductive a relatively weak current, of the order of a thousandth of the current $I_t$ which is reached after the conductive state has been brought about.

In order to restore the thyristor to the non-conductive state, it appears to be logical to proceed inversely, i.e. to extract from the base layer 5 by application of a pulse of opposite sign to that specified above, a majority carrier current sufficient to cause the sum $(\alpha_1+\alpha_2)$ to fall below 1. An elementary calculation shows that it is sufficient for this purpose to extract a base current:

$$I_B > I_t \frac{(\alpha_1+\alpha_2)-1}{\alpha_1} \quad (1)$$

Accordingly, in "blockable" thyristors, the sum $(\alpha_1+\alpha_2)$ can be made only slightly higher than 1 by appropriate means, even under boost conditions, $\alpha_1$ being slightly lower than 1. Thus, what is known as the "gain at opening" is ensured, the blocked current $I_t$ having to be a multiple (several times and even several tens of times) of the control current $I_B$, in accordance with Equation 1.

In order to do this, however, the value of the factor $\alpha_2$ must be limited as much as possible, and it follows that the second transistor, the P-N-P transistor in this instance, has little effect. Consequently, the density of the current $I_t$ in the conductive state is substantially reduced and despite this the voltage drop is substantially increased. Now, this double sacrifice on the characteristics in the conductive state is scarcely compensated for by the performances at the change to the non-conductive state, which remain extremely modest, as already pointed out. The fundamental reasons for these counter-performances have already been indicated, but it is desirable to deal with them in greater detail in order that the advantage of the present invention may be more readily understood.

Figure 3:
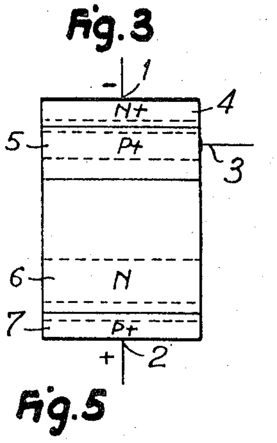

For this purpose, reference will now be made to FIGURE 3, which shows diagrammatically in chain lines the development of the junction zones of the thyristor of FIGURE 1 in the non-conductive state. The junctions 4–5 and 6–7 being biassed in the forward direction, the thickness of their respective zones is very small. It is true that there are substantially no free carriers in these zones, but this is due solely to the fact that the current is blocked by the inversely biassed junction 5–6. The space charge of the latter junction is thus greatly extended, and it is obvious that the second base layer 6 will have to be accordingly thickened.

Now, in the conductive state, all these layers, including the junctions of considerably reduced thickness, will be invaded by a plasma of free carriers of both signs, of relatively high density. By extracting the majority carriers from the first base layer 5, the emission of carriers from the junction 4–5 may be reduced, or better still suppressed, but the regeneration of the space charge of the junction 5–6 cannot be forced. Whilst the elimination of majority carriers from the first base layer 5, in the present instance holes, is fairly readily understandable, the forced elimination of majority carriers from the second base layer 6, in the present instance electrons, is much less readily understandable.

In order to understand it, it is sufficient to observe that in the example under consideration, the holes will be evacuated by the control electrode 3 and the electrons must be evacuated by the cathode 1 after passing through the layers 6 and 7 and finally the load resistors, or what would be better, through a capacitance connected between the cathode 1 and the anode 2. However, in order to do this, it is necessary that the respective polarities of the control electrode 3 and the cathode 1, the electrode 3 being negative in relation to the cathode 1, should remain fixed. Now, it is here that one of the major difficulties arises, because the recovery voltage tends to reverse these polarities, the control electrode 3 having to become positive in relation to the cathode 1. It is therefore necessary that it should be possible to effect this elimination before the voltage is restored, and this entails the necessity to establish a compromise between the pulse voltage and the recovery voltage, as also the speed of this recovery. In practice, this leads to a serious limitation of the performances on the plane of the duty voltage.

With regard to the current limitation, this is also readily understandable. On the one hand, the higher the current density, the more difficult will be the elimination of the free charge carriers; and on the other hand, for very low current densities, the recombination in situ will be sufficient to eliminate carriers. Furthermore, with equal density, the larger the transverse dimensions of the construction, and therefore the higher total current, the more difficult the operation will be. One of the major reasons for this snag is the increasing difficulty of ensuring uniform distribution of the blocking pulse effect throughout the cross-section of the edge at which this pulse is injected. It should not be overlooked that, in contrast to the deblocking process, it is absolutely essential, in order that the blocking process is successful, that it should be extended over the entire transverse section of the device, without any gap.

This having been postulated, it will now be demonstrated that the construction of the bipolar power gridistor affords the possibility of eliminating both fundamental difficulties of the blocking operation as discussed above. FIGURES 4 and 5 again illustrate this construction in diagrammatic form.

Figure 5:
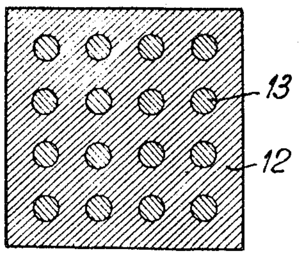

The bipolar power gridistor comprises three electrodes, including two terminal electrodes, the cathode 8 and the anode 9, and an intermediate electrode, the grid electrode 10. The essential element of this construction is the grid electrode 10. This is integrated into the intermediate layer of the construction, i.e. the semi-conductor layer 11, which is for example of the N-type. The body 12 of the grid is then of P-type, the meshes being filled with channels 13 of N-type. This grid layer is shown in FIGURE 5. In addition, the construction comprises the N+ cathode layer 14 and the P+ anode layer 15. The latter layer contains N-type channels 16, which shunt the junction 15–11. However, it is to be understood that the anode layer 15 may also be uniformly P+, i.e. without any shunting channels.

It will also be remembered that, in the conductive state, this construction is traversed between the cathode 8 and the anode 9 by a flux of carriers having two signs, the grid electrode 10 not being fed. In order to block the current, the grid electrode 10 is rendered negative in relation with the cathode 8 by the application of an appropriate voltage between the grid 10 and the cathode 8. By doing this, the carrier plasma is extracted and, in proportion as it is extracted, the space charge is developed in the meshes of the grid 10, and finally, on either side of the grid. The conductive channels are thus effectively eliminated and the current is interrupted, except for the junction leakage current, which is substantially negligible.

It will be observed that the voltage which is restored between across the gridistor during the blocking process here tends to hasten this process both for the elimination of the plasma and for the development of the space charges. On the other hand, it will be observed that the action is remarkably well distributed throughout the cross-section of the construction. Thus, the bipolar power gridistor is, by virtue of its construction, clearly capable of performing an effective blocking of considerable currents at high recovery voltages.

Figure 6:
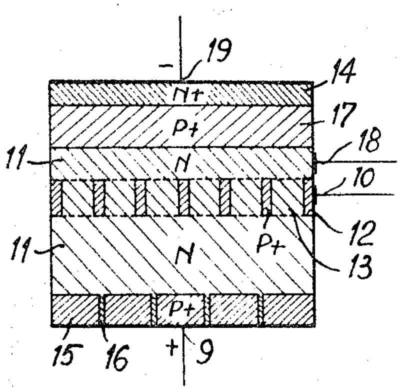
FIGURE 6 is an elevational sectional view of a preferred form of unidirectional bistable gridistor having an enclosed grid.
Figure 7:
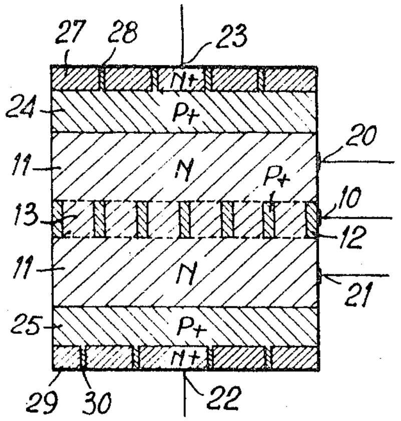
FIGURE 7 is an elevational sectional view of a preferred form of bidirectional bistable gridistor having an enclosed grid.

In accordance with the present invention, this construction is designed as diagrammatically illustrated in FIGURES 6 and 7 in order to render the gridistor bistable, notably as a unidirectional device (FIGURE 6) and as a bidirectional device (FIGURE 7).

Figure 4:
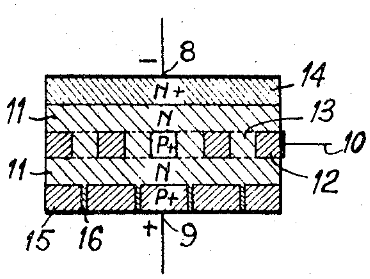
FIGURES 4 and 5 are sectional views in elevation and in plan respectively of a known type of a bipolar power gridistor.

The construction of FIGURE 6 differs from that of FIGURE 4 only by the insertion of a layer 17 (P+) between the layers 11 and 14 (N and N+ respectively). In addition, a second control electrode 18 is connected to the semiconductor layer 11 nearest the cathode 8.

The operation of such a unidirectional bistable gridistor is accordingly as follows. With the device in the conductive state, the control electrodes 10 and 18 not being fed, the current is blocked by applying between these electrodes a voltage pulse of appropriate amplitude and sign (the electrode 10 becoming negative in relation to 18) to effect a complete striction of the channels 13. With regard to the prior elimination of the plasma, it will be noted that, having regard to the bistable character of the device, it will be sufficient to free the volume of the channels 13 which is in any case very limited, in order to permit blocking thereof, which will involve a drop in the value of the factors $\alpha_1$ and $\alpha_2$ of the construction and the "triggering" of the gridistor to the non-conductive state.

In order to restore the gridistor to the conductive state, a pulse will be applied between the control electrode 18 and the anode 9, whereby the electrode 18, and thus the whole layer 11 (N), will be rendered negative in relation to the anode 9, and therefore in relation to the layer 15 (P+), so as to produce an injection of holes. The process of "triggering" to the conductive state is thus initiated, as in conventional bistable P-N-P-N devices.

As in the original gridistor, the shunting of the layer 15 by channels 16 is here by no means essential. On the other hand, the shunting of the two extreme layers is of definite use in the case of a bidirectional bistable gridistor.

Referring now to FIGURE 7, the bidirectional gridistor comprises five layers of alternate N-P-N-P-N types, the intermediate layer N containing the P+ grid consisting of a body 12 and meshes 13 filled with channels N connecting the two sections of the layer 11. The layer 11 is covered on both faces by two P+ layers denoted by 24 and 25, which in turn are covered by two extreme N+ layers, denoted by 27 and 29, and shunted by P+ channels denoted by 28 and 30 respectively.

This shunting is provided for the following reason. It is known that a five-layer bidirectional bistable construction may be subdivided into two imbricated transistors, as illustrated in FIGURE 2 in the case of the four-layer structure, but with a series diode in addition. In accordance with each alternation, this diode will be positioned either at one end of the equivalent circuit or at the other end, but it will always be inversely biased. Consequently, in order that such a diode may not inadmissibly increase the voltage drop in the conductive state, it is essential to arrange that the voltage drop across the terminals in the inverse state should be very low. One of the solutions which may be applied for this purpose is to shunt the affected junction, which is already done for other purposes in the bipolar power gridistor.

The device comprises five electrodes distributed as follows: three control electrodes, the grid electrode 10, and the electrodes 20 and 21 connected to the two sections of the layer 11, which are situated on either side of the grid 12; and two terminal electrodes 22 and 23 alternately performing the function of the cathode and the anode.

Figure 8:
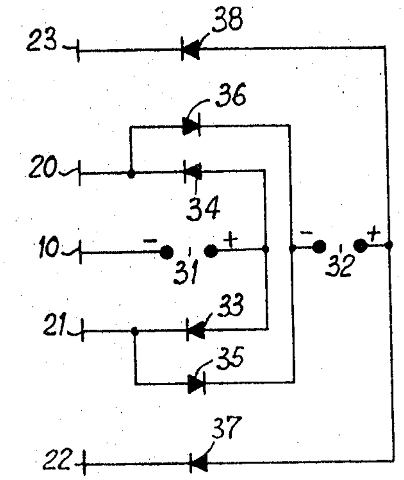
FIGURE 8 illustrates a control circuit for use with the bistable gridistor shown in FIGURE 7.

The control pulse in the blocking process will be applied between the electrode 10 (negatively biassed) and the electrode 20 or 21 which is on the same side as the terminal electrode performing the function of the cathode at the given instant. The deblocking control pulse will be applied between the electrode performing the function of the cathode and the nearer of the electrodes 20 and 21. The circuit arrangement of FIGURE 8 comprising diodes 33, 34, 35, 36, 37, 38 enables these conditions to be satisfied by appropriately directing the blocking pulse applied to terminals 31 and the deblocking pulse applied to terminals 32.

Figure 9:
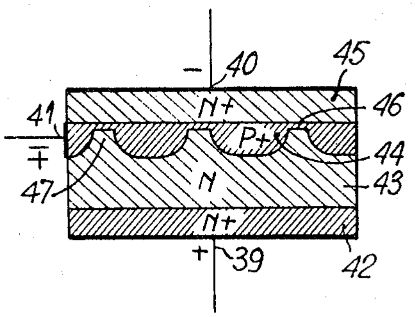
FIGURE 9 is an elevational sectional view of a known type of bivalent triode.

The construction of the bistable gridistor may to some extent be simplified by integrating the blocking system in one of the bases of the construction, utilising as fundamental element the so-called bivalent triode, which is itself derived from the original gridistor. The construction of this triode is shown in FIGURE 9.

This triode has been described as "bivalent" because, in accordance with the sign of the bias applied to the control electrode, it functions either as an injection transistor or as a field-effect device. When employed as a base element of a bistable device, it must be able to effect the "triggering" to the conductive state, by its operation as a transistor, and the blocking by its operation as a field-effect device. The triode comprises essentially a N layer 43 having a serrated profile, the cavities between the teeth and the teeth themselves being covered by a P+ layer 44. These two layers are in turn covered by extreme N+ layers 42 and 45, to which the anode 39 and the cathode 40 are respectively connected. The intermediate control electrode 41 is connected to the layer P+ 44.

The serrated P+ layer 44 is comparable to a relatively thick grid in which the meshes have been closed by thin films 46. These films constitute the base of the N-P+-N+ transistors when the bias applied to the layer 44 by the electrode 41 is positive in relation to the cathode 40. On the other hand, in the absence of bias or with negative bias at the layer 44, a so-called limited space charge and field-effect triode is concerned.

In the absence of bias, the thickness of the charge is limited to that of the films 46. Under the effect of negative bias, its thickness increases by centripetal striction of the teeth in the layer 43, the zone of centripetal striction being indicated at 47, whereby the height of the teeth is gradually shortened. It is known that if the geometrical form of these teeth is compared, as a first approximation, to that of a frustum of a cone, the variation of the thickness of the space charge L with the bias voltage $V_g$, due to the centripetal striction, is given by the following expression:

$$\Delta L = \frac{a \Delta V_g}{2r \tan \beta} \quad (2)$$

in which $r$ is the radius at the apex of the frustum, $\beta$ the opening angle of the frustum of a cone $a = Po4\epsilon_0\epsilon_r$ (in rationalized MKS units), $P_0$ being the density of the charge, $\epsilon_0$ the dielectric constant of the vacuum, and $\epsilon_r$ the relative dielectric constant of the semiconductor material employed.

It is thus possible to obtain a rapid variation of the thickness of the space charge as a function of the bias voltage $V_g$, by an appropriate choice of the radius $r$ and of the angle $\beta$ for a charge density P in the layer 43. The negative bias thus here acts on the one hand by extraction of the majority carriers from the layer 44 and of the minority carriers from the layer 44, and on the other hand by a modification of the geometrical configuration which ultimately leads to the blocking of the current.

Figure 10:
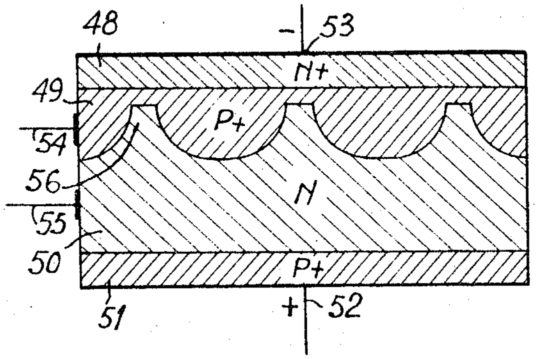
FIGURE 10 is an elevational sectional view of another form of unidirectional bistable gridistor having serrated and imbricated bases.

FIGURE 10 diagrammatically illustrates the arrangement of this structure as a bistable power gridistor. Basically, it differs from FIGURE 9 only by the replacement of one of the extreme N+ layers by a P+ layer and by the addition of a second control electrode. It will thus be seen that "the closed-mesh grid" forms one of the bases of the N-P-N-P structure. The other differences are dimensional, because they arise out of the transposition of the weak-current zone with the heavy-current zone.

The bistable power gridister comprises a first N+ layer 48, a serrated P+ layer 49, a second serrated N layer 50, fitting into the preceding one, and finally a second P+ layer 51. The anode 52 is connected to the P+ layer 51 and terminal electrodes are, respectively, the anode the cathode 53 to the N+ layer 48. The two control electrodes are the electrode 54 connected to the P+ layer 49 and the electrode 55 connected to the N layer 50.

In order to effect the blocking of the current, a pulse is applied to the control electrodes, whereby the layer 54 is rendered negative in relation to the layer 55. This pulse produces a substantial reduction of the current and a modification of the geometrical configuration owing to the filling of the teeth 56 with space charges. This results in a reduction, in this double respect, of the factors $\alpha_1$ and $\alpha_2$ previously considered and the "triggering" of the device into the non-conducting state.

It will be observed that an appreciable difference as compared with the bivalent triode resides in that the voltage is applied to the N layer 50 directly instead of through space charges, if contact was made with the N+ layer 48. A more rapid extraction of the free charge carriers is thus ensured, as also a better effectiveness of the field effect. In addition, the recovery voltage will here act in the same sense as the blocking control voltage.

However, it would be possible in a variant to dispense with the electrode 55 in the case of relatively low operating currents and voltages, and to apply the blocking pulse between the cathode 53 and the electrode 54, the latter then becoming negative in relation to the former. In order to restore the conductive state, the pulse will be applied between the cathode 53 and the electrode 54, whereby the latter is rendered positive in relation to the former. The deblocking process is similar to that previously commented on with reference to the thyristors of FIGURE 3 and to the bistable gridistor comprising a grid as illustrated in FIGURE 6.

Figure 11:
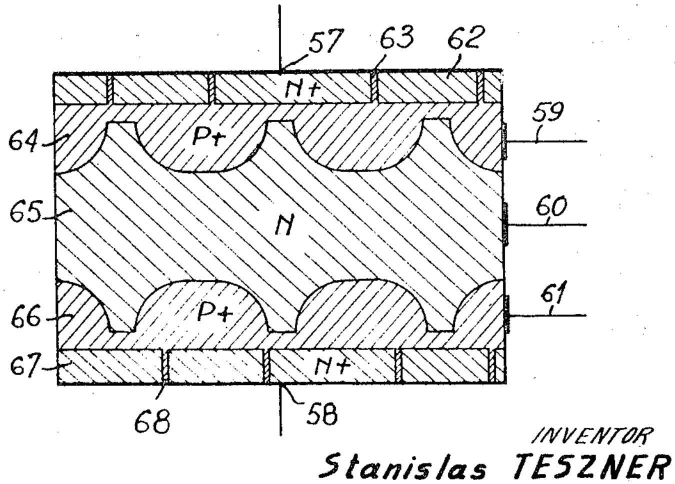
FIGURE 11 is a diagrammatic elevational sectional view of another form of bidirectional bistable gridistor having a double-serrated central base layer.

Another form of bidirectional bistable gridistor is shown in FIGURE 11. The N-P-N-P-N structure illustrated comprises five electrodes, made up of two terminals 57 and 58 acting alternately as the cathode and the anode, and three control electrodes 59, 60 and 61. It is composed of a first N+ layer 62 and shunted by P+ "bridges" 63, a first serrated P+ layer 64, from which the bridges 63 extend, a central N base layer 65, a second serrated P+ layer 66, and finally a second N+ layer 67, shunted by P+ bridges 68 extending from the P+ layer 66.

Figure 12:
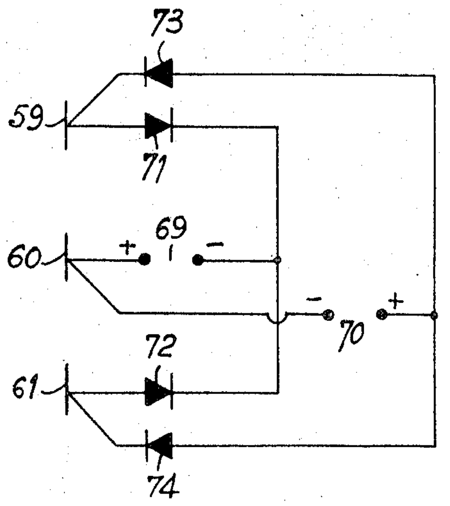
FIGURES 12 and 13 illustrate two different types of control circuits for use with the bistable gridistor shown in FIGURE 11.

The blocking and deblocking may be controlled in accordance with the control circuit shown in FIGURE 12 by pulses produced from the source 69 and the source 70 respectively, and directed to the electrodes 60 and 59 or to the electrodes 60 and 61, depending upon the alternation, through diodes 71 and 72 for the blocking and by diodes 73 and 74 for the deblocking.

Figure 13:
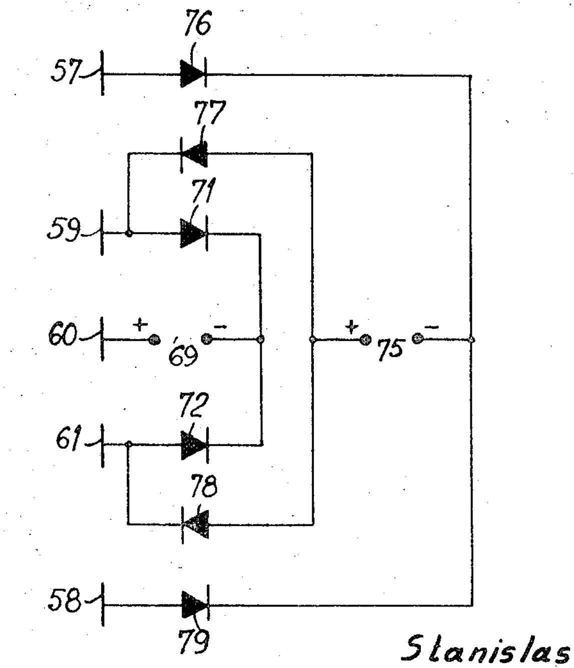

An alternative form of control circuit is shown in FIGURE 13. In this arrangement, the blocking control circuit is the same as in FIGURE 12, but the deblocking circuit differs in that the deblocking is controlled by a pulse supplied by a source 75 and applied between the electrodes 57 and 59 or 58 and 61, depending upon the alternation. The transmission of the pulse towards the appropriate terminals is effected through the diodes 76, 77, 78 and 79.

Figure 14:
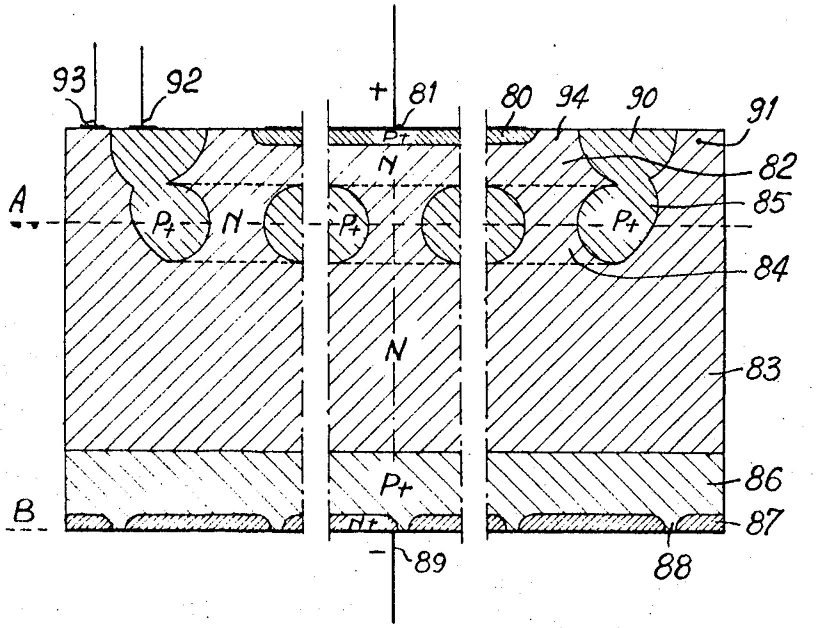
FIGURE 14 is an elevational sectional view of the detailed construction of the bistable gridistor shown in FIGURE 6, of industrially practicable form.
Figure 15:
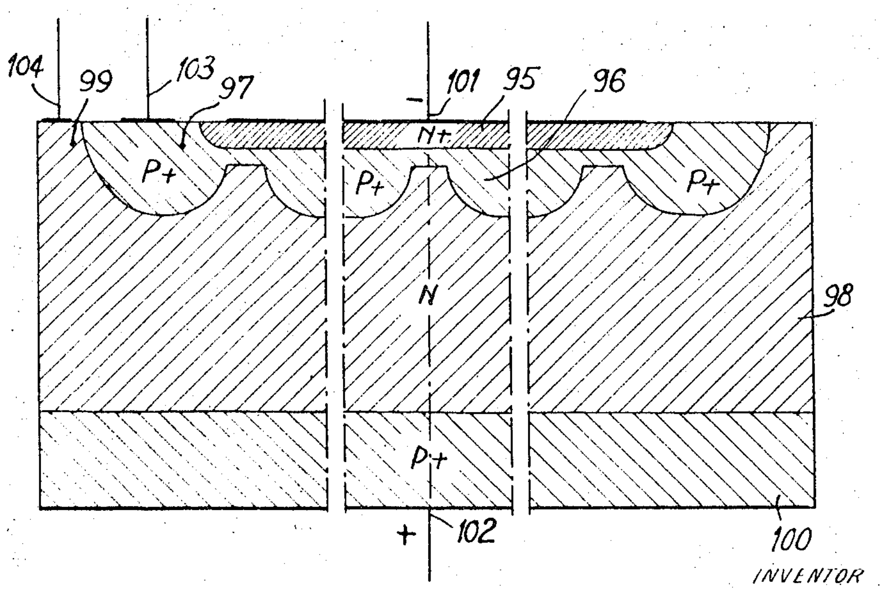
FIGURE 15 is an elevational sectional view of the construction of the bistable gridistor shown in FIGURE 10, of industrially practicable form.

Finally, FIGURES 14 and 15 show by way of example the structures of FIGURES 6 and 10 respectively which have been modified to enable them to be manufactured industrially in large numbers.

FIGURE 14 shows the essential features of the structure of an enclosed-grid unidirectional bistable gridistor. It comprises a P+ emitter layer 80, provided with an electrode 81 forming the anode, a first N base layer comprising two sections 82 and 83, connected together by N channels 84 extending through the grid 85 enclosed in the base layer, a second P+ base layer 86 and finally a N+ emitter layer 87 shunted by P+ "wedges" 88 extending from the base layer 86. The emitter layer 87 is provided with an electrode 89 forming the cathode. In addition, two control electrodes 92 and 93 are secured to two annuli 90 and 91 respectively, one of which is connected with the grid 85 and the other with the section 83 of the first base layer.

In order to produce this structure, the following methods of manufacture may be employed. A N-type semiconductor wafer, for example of silicon, having relatively high resistivity, of the order of 100 ohm-cm., is employed. This wafer is perfectly polished on both faces, its thickness being, for example, of the order of 150$\mu$. This thickness corresponds to the distance between the two chain lines marked A and B in FIGURE 14.

An impurity of group III, for example boron, is then prediffused into the two faces, into one face through an oxide mask in order to initiate the formation of the grid 85, and into the other face without any mask, in order to initiate the formation of the base layer 86. The diffusion both of the grid 85 and of the base layer 86 will continue during the succeeding operations. These operations are after removal of the oxide from the upper face, (1) deposition by epitaxial growth of a N layer, preferably having a resistivity of the same order as that of the substratum, but with a very wide tolerance (in a particular case, this resistivity could, without major disadvantage, be between 10 and 100 ohm-cm.); (2) diffusion of boron in a very high concentration, and therefore at high speed, to form the ring 90; (3) diffusion through a mask of the emitter layer 87 (diffusion of an impurity from the group V, for example phosphorus); and finally (4) diffusion through a mask of the emitter layer 80 (again diffusion of boron as for 85 and 86). It should be remembered that the layer 87 may here also be continuous and homogeneous, of the N+ type. It is also to be understood that other epitaxial operations may replace certain diffusion operations, for example in regard to the N+ emitter layer, if the latter is continuous. The structure is completed by the welding of the electrodes 81, 89, 90 and 91.

The practical construction of the bidirectional bistable gridistor may similarly be readily derived from FIGURE 7. It is also to be noted that in FIGURE 14 the N annulus 94 which brings to the surface the upper edge 82 of the central base layer of this structure is already adapted to receive the third control electrode necessary for the bidirectional structure. It is to be understood that the epitaxial layer must in this latter case be much thicker without the depositing operation excessively affecting the diffusion of the previously pre-diffused layers. This operation will therefore preferably be carried out at relatively low temperature, i.e. at about 1000° C., for example by the pyrolysis method, consisting in decomposing $SiH_4$ in a current of $H_2$.

FIGURE 15 in turn illustrates the industrial form of the structure shown in FIGURE 10 of the unidirectional bistable gridistor, derived from the bivalent triode.

This structure comprises a N+ cathode emitter layer 95, a first P+ base layer 96, serrated as explained with reference to FIGURE 10, and brought to the surface by the annulus 97, in order to permit the contacting, a second N base layer 98, also serrated and fitting into the previous one, with the surface annulus 99, and finally, a P+ anode emitter layer 100. This bistable gridistor comprises four electrodes, including two terminals, i.e. the cathode 101 and the anode 102, and two control electrodes 103 and 104.

It may be produced by diffusion operations, by the following procedure: A relatively thick wafer, of the order of 200$\mu$, polished on both faces, and consisting of N-type silicon of relatively high resistivity, of the order of 100 ohm-cm., is employed. There is then diffused therein an impurity of the group III, for example boron, forming on the one hand on one face the anode layer 100 and on the other hand, on the other face, through a mask, the grid constituting the initiation of the serrated base layer 96. This base layer is completed by diffusion of the same impurity, after removal of the first mask and replacement thereof by a simple frame merely covering the annulus 99. The last diffusion of an impurity of the group V, for example of phosphorus, in a very high concentration, which takes place through a mask, results in the formation of the N+ cathode emitter layer 95. Finally, the electrodes 101, 102, 103 and 104 are soldered.

The manufacturing operations are thus relatively simple and require no recourse to epitaxy. However, it is to be understood that recourse may very well be had thereto, for example, for the formation of the layer 100, in which it is desirable to have an abrupt junction and also for replacing the diffusion of the P+ layer which closes the grid, in order to minimise lateral diffusion.

Likewise, and this is equally applicable to the structure explained with reference to FIGURE 14, certain diffusing operations, more particularly the formation of emitter layers, may be replaced by alloying operations, for example with aluminium or gold-antimony.

The application of the manufacturing technique described in the foregoing to the production of the bidirectional structure of FIGURE 11 affords no particular difficulty. The procedure always commences with a homogeneous N-type wafer of high resistivity, and the operation is carried out symmetrically, i.e. in the same manner on the opposite faces. There will be two terminal layers, for example N+ layers, diffused through a mask, leaving shunting bridges of the P+ type. On the other hand, there will be in all five electrodes, made up of three control electrodes and two terminal electrodes.

These structures have only been described by way of example. It is therefore to be understood that their forms may vary, as also the materials employed. More particularly, other substances of the group IV of intermetallic compounds of the groups III and V may be employed, provided that the principles set forth in the foregoing are utilised therein. Finally, in order to give an idea of the order of magnitude of the main performances which may be reached with these structures, the following figures may be quoted:

| | | |
|---|---|---|
| Continuous duty current, which may be switched on or off | a | 100 |
| Voltage drop corresponding to the conductive state | v | 1.5 |
| Admissible recovery voltage at break | v | 500 |

Whilst the above examples illustrate semiconductor bistable switching devices with the layers of N or P type semiconductor material as shown the types of layers may be reversed. For example the N-P-N-P-N device shown in FIG. 11 could be replaced by a P-N-P-N-P device.

What I claim is:

1. A heavy duty semiconductor bistable switching device having at least four semiconductor layers of alternate P and N types, a semiconductor grid embedded in one of the intermediate layers and forming a rectifying P-N junction therewith, terminals connected to the end layers and control electrodes connected to the grid and at least one other intermediate layer, whereby said device is rendered conductive by the application of a pulse between the control electrode connected to the intermediate layer and the terminal connected to the outside layer nearest thereto and is rendered non-conductive by the application of a pulse between said intermediate layer and grid.

2. A device according to claim 1 having a first semiconductor layer of a first type (either P or N), a second semiconductor layer of opposite type covering this first layer and joined therewith, a semiconductor grid of the first type embedded in the second layer, a third semiconductor layer of the first type covering the second layer and joined therewith, a fourth semi-conductor layer of opposite type to the first layer covering the third layer and joined therewith, terminals connected to the first and fourth layers, and control electrodes connected to the grid and second layer, whereby said device is rendered conductive by the application of a pulse between the first and second layers and is rendered non-conductive by the application of a pulse between the second layer and grid.

3. A device according to claim 2, wherein the first layer contains channels of opposite type to that in the first layer, the channels shunting the junction formed between the first and second layers.

4. A device according to claim 2 or 3, wherein the first and third layers and also the grid are P type layers whilst the second and fourth layers are N type layers.

5. A device according to claim 2 which is bidirectional, wherein a fifth layer of the opposite type to the first layer is positioned between the first layer and the second layer, the grid being centrally placed within the second layer which now becomes the centre layer, a pair of electrodes being connected to the two sections of the second layer divided by the grid whereby the device is rendered conductive by the application of a pulse between either the fifth layer and the section of the second layer nearest the fifth layer or the fourth layer and the section of the second layer nearest the fourth layer according to the alternation of the voltage and is rendered non-conductive by the application of a pulse between the grid and one or other section of the second layer according to the alternation of the voltage.

6. A device according to claim 5, wherein the fourth and first layers both contain channels of opposite type to that in the layers, the channels shunting the junction formed between the fourth and third layers and fifth and first layers respectively.

7. A device according to claim 5 or 6, wherein the first and third layers and also the grid are P type layers, whilst the second, fourth and fifth layers are N type layers.

8. A device according to claim 1, having a first semiconductor layer of a first type (either P or N), a second semiconductive layer of opposite type covering this first layer and joined therewith, a third semiconductive layer of the first type covering the second layer and joined therewith, the junction between the second and third layers being of serrated profile, a fourth semiconductive layer of opposite type to the third layer, said third layer making up a grid in which the meshes have been closed by the narrow constricted zones formed in the third layer between the second and fourth layers by the serrated profile, terminals connected to the first and fourth layers, and control electrodes connected to the grid constituted within the third layer and to the second layer, whereby said device is rendered conductive by the application of a pulse between the grid and the fourth layer and is rendered non-conductive by the application of a pulse between the second layer and the grid constituted within the third layer.

9. A device according to claim 8, wherein the first and third layers are of the P type whilst the second and fourth layers are of the N type.

10. A device according to claim 8 which is bidirectional, wherein a fifth layer of opposite type is positioned between the first layer and the second layer and wherein the junction between the fifth and second layers is of serrated profile, said fifth layer making up another grid, a third control electrode being connected to the fifth layer, whereby the device is rendered conductive by the application of a pulse between either the first layer and the fifth layer constituting a grid or the fourth layer and the third layer constituting a grid according to the alternation of the voltage and is rendered non-conductive by the application of a pulse between the second and first layers or the second and third layers according to the alternation of the voltage.

11. A device according to claim 10, wherein the fourth and first layers both contain channels of opposite type to that in the layers, the channels shunting the junction formed between the fourth and third layers and fifth and first layers respectively.

References Cited

FOREIGN PATENTS 948,239 1/1964 Great Britain.

JOHN W. HUCKERT, Primary Examiner

J. D. CRAIG, Assistant Examiner

U.S. Cl. X.R.

307—299, 305